United States Patent
Vanjari et al.

(10) Patent No.: US 12,321,293 B1
(45) Date of Patent: Jun. 3, 2025

(54) COMMUNICATION INTERFACE CONTROLLER WITH OUTPUT MONITORING

(71) Applicant: Texas Instruments Incorporated, Dallas, TX (US)

(72) Inventors: Ashish Vanjari, Sugar Land, TX (US); Mohammed Arif, Bangalore (IN); Shailesh Ganapat Ghotgalkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/512,210

(22) Filed: Nov. 17, 2023

(51) Int. Cl.
*G06F 13/24* (2006.01)
*G06F 13/16* (2006.01)

(52) U.S. Cl.
CPC .......... *G06F 13/24* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 2003/0179736 A1* | 9/2003 | Weisler | H04L 43/18 714/E11.201 |
| 2016/0077995 A1* | 3/2016 | Mishra | G06F 13/4221 710/106 |

* cited by examiner

*Primary Examiner* — Michael Sun
(74) *Attorney, Agent, or Firm* — Brian D. Graham; Frank D. Cimino (57) ABSTRACT

In described examples, an integrated circuit includes a first pin, a second pin, a processor, a bus monitor, a clock circuit, and a transceiver. The processor provides to the transceiver and the bus monitor an instruction that indicates an instructed target address, a read/write flag, and a memory address. The transceiver provides to the first pin and the bus monitor a clock signal, and provides to the second pin and the bus monitor a message so that the message includes a messaged target address, the read/write flag, and the memory address. The bus monitor compares the instructed target address to the messaged target address, and provides a signal to the processor in response to the comparison.

20 Claims, 7 Drawing Sheets

COMMUNICATION INTERFACE CONTROLLER WITH OUTPUT MONITORING

TECHNICAL FIELD

This application relates generally to controller-target communication interfaces, and more particularly to detecting an output fault of a controller.

BACKGROUND

Inter-Integrated Circuit (I²C, pronounced I-squared-C and alternatively known as I2C or IIC) is a synchronous, multi-controller/multi-target, single-ended, serial communication bus. In some examples, I²C is used for communicatively connecting integrated circuits (ICs), such as lower-speed peripheral ICs, to processors or microcontrollers. In some examples, I²C enables short-distance communication among ICs attached to each other on a printed circuit board (PCB). In some examples, I²C is used to connect ICs for industrial or automotive applications.

SUMMARY

In described examples, an integrated circuit includes a first pin, a second pin, a processor, a bus monitor, a clock circuit, and a transceiver. The processor provides to the transceiver and the bus monitor an instruction that indicates an instructed target address, a read/write flag, and a memory address. The transceiver provides to the first pin and the bus monitor a clock signal, and provides to the second pin and the bus monitor a message so that the message includes a messaged target address, the read/write flag, and the memory address. The bus monitor compares the instructed target address to the messaged target address, and provides a signal to the processor in response to the comparison.

DETAILED DESCRIPTION

In some examples, an I2C system 100 includes at least one controller MCU 102 with a transceiver 118 coupled to one or more targets 104a, 104b, . . . 104N, via a serial data (SDA) bus 108. The transceiver 118 receives instructions from a CPU 114, from which the transceiver 118 communicates a serial data stream to the serial data (SDA) bus 108. The serial data stream includes various information, including an address to identify one of the targets, so that the addressed target may respond appropriately. To reduce the possibility of target addressing inaccuracies by the MCU 102, the controller MCU 102 also includes a bus monitor 120, which checks for proper addressing of a target by comparing the target address identified by the CPU 114 instruction with the corresponding target address identified by the CPU-instructed transceiver 118. Error mitigation is implemented if a target address mismatch is detected.

Herein, some structures or signals that are distinct but related have reference numbers that use a [number][letter] format, such as targets 104a, 104b, . . . 104N, and controllers 202a, 202b, . . . 202M. In some examples, these structures or signals are referred to generally, in the singular or as a group, using the [number] and without the [letter], such as the targets 104 and the controllers 202. Also, the same reference numbers or other reference designators are used in the drawings to designate features that are related structurally and/or functionally.

Figure 1:
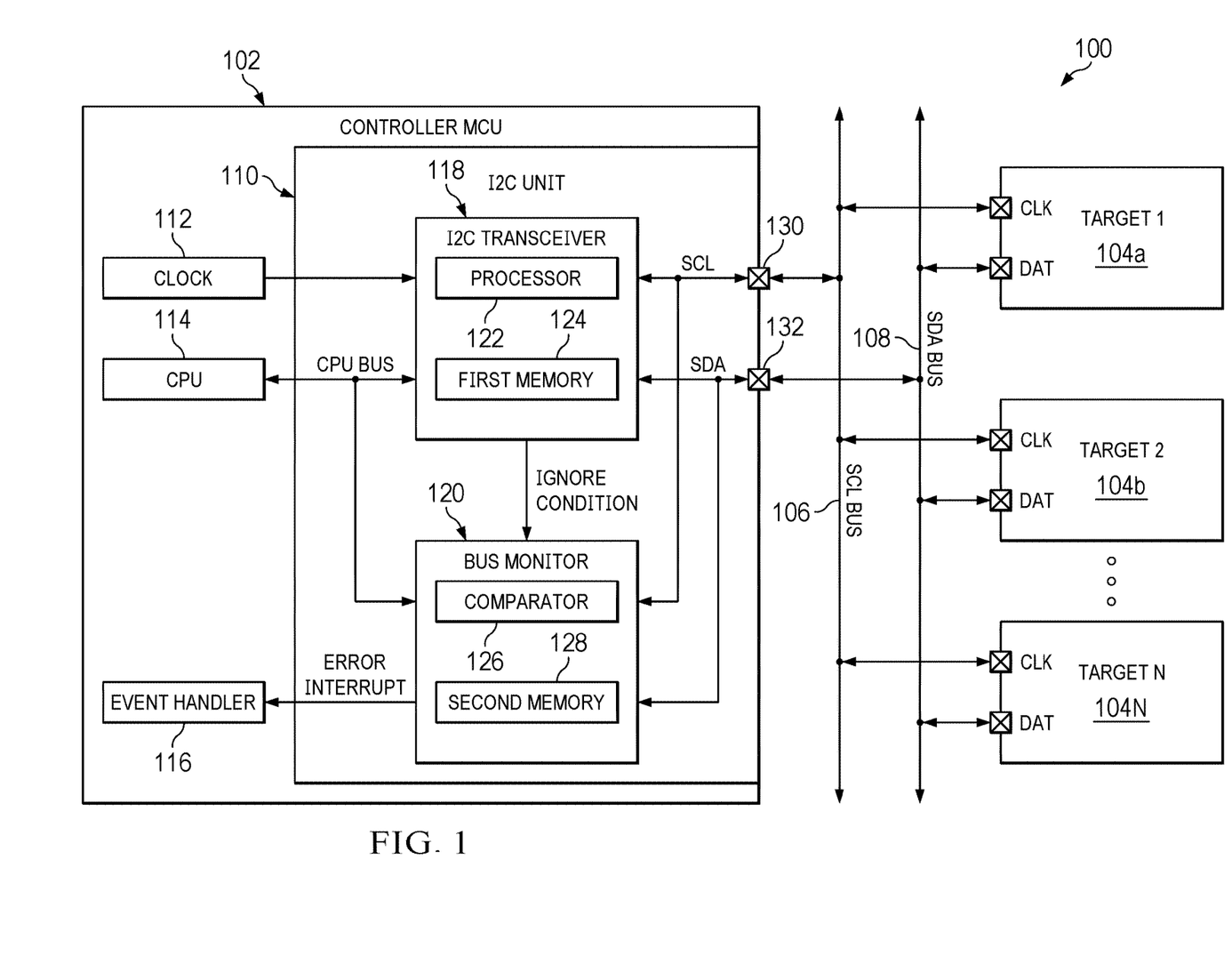
FIG. 1 is a functional block diagram of an example I2C system.

FIG. 1 is a functional block diagram of an example I2C system 100. The I2C system 100 includes a controller microcontroller unit (controller MCU) 102 used as a controller 202 (see FIG. 2) of the I2C system 100, multiple target ICs (targets) 104 used as targets of the I2C system 100, a serial clock (SCL) bus 106, and an SDA bus 108. There are a number N targets 104, including a first target (target 1) 104a, a second target (target 2) 104b, through an $N^{th}$ target (target N) 104N. Communication occurs between the controller MCU 102 and any of the targets 104, via the SDA bus 108. As detailed later starting in FIG. 3A, such communications are provided by groupings of serial data on the SDA bus 108, where different serial data groups can provide, for example, singular control bits (such as read, write, start, stop, acknowledge) or plural data bits (such as target addresses).

The controller MCU 102 includes an I2C unit 110, a clock 112 that provides a clock signal at a base frequency, a central processing unit (CPU) 114, and an event handler 116. The I2C unit 110 includes an I2C transceiver 118 and a bus monitor 120. The I2C transceiver 118 includes a processor 122 and a first memory 124. The bus monitor 120 includes a comparator 126 and a second memory 128.

An output of the clock 112 is connected to a clock input of the I2C transceiver 118. A data terminal of the CPU 114 is connected, via a CPU bus, to a data terminal of the I2C transceiver 118 and a first data input of the bus monitor 120. An ignore condition output of the I2C transceiver 118 is connected to an ignore condition input of the bus monitor 120. An SCL terminal of the I2C transceiver 118 is connected to an SCL pin 130 of the controller MCU 102 and to a clock input of the bus monitor 120. An SDA terminal of the I2C transceiver 118 is connected to an SDA pin 132 of the controller MCU 102 and to a second data input of the bus monitor 120. An error interrupt output of the bus monitor 120, from which the bus monitor 120 provides an asserted or deasserted Error Interrupt signal, is connected to an input of the event handler 116. An asserted Error Interrupt signal corresponds to an I2C addressing fault detected by the bus monitor 120.

The SCL pin 130 is connected to the SCL bus 106. The SDA pin 132 is connected to the SDA bus 108. The targets 104 respectively include a clock input and a data input. The respective clock inputs of the targets 104 are connected to the SCL bus 106, and the respective data inputs of the targets 104 are connected to the SDA bus 108. Example structure and functionality of the controller MCU 102 to apply signals to and monitor signals on the SDA bus 108 is described with respect to FIG. 2.

Figure 2:
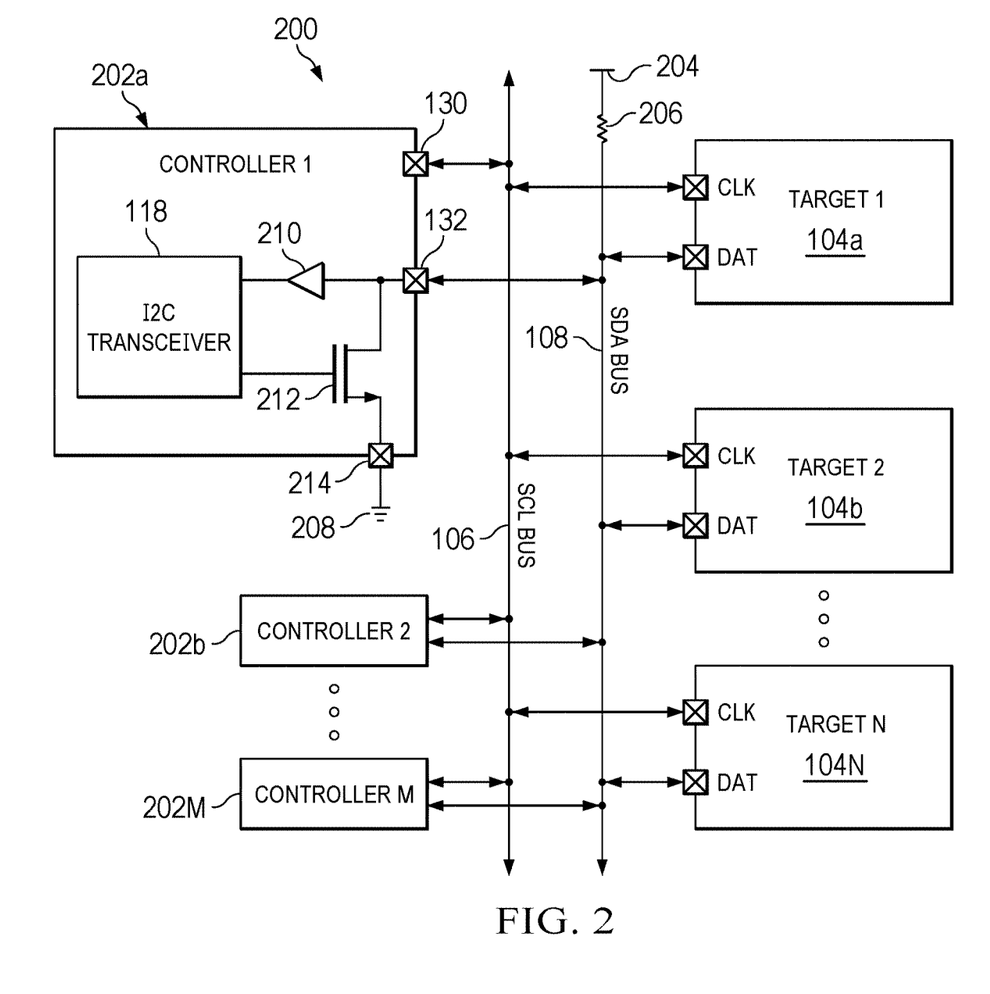
FIG. 2 is a functional block and circuit diagram of a second example I2C system.

FIG. 2 is a functional block and circuit diagram of a second example I2C system 200, with multiple controllers 202 and multiple targets 104, that is, a multi-controller 202 and multi-target 104 topology. FIG. 2 also shows example circuitry for determining logical values of bits in SDA signals. Each of the controllers 202 and targets 104 is respectively connected to the SCL bus 106 and the SDA bus 108. The SDA bus 108 includes a voltage source 204 providing a source voltage, and a resistor 206. The I2C system 200 also includes a ground 208.

There are a number M controllers 202. The controllers 202 include a first controller (controller 1) 202a, a second controller (controller 2) 202b, through an $M^{th}$ controller (controller M) 202M. In some examples, each of the controllers 202 can correspond to a controller MCU 102. Each of the controllers 202 is connected to the SCL bus 106 and the SDA bus 108.

The first controller 202a is shown and described as representative of the controllers 202. In some examples, the first controller 202a corresponds to the controller MCU 102. The first controller 202a includes a buffer 210, an n-channel metal-oxide-semiconductor field-effect transistor (an NMOS) 212, and a ground pin 214.

The SDA pin 132 of the first controller 202a is connected to an input of the buffer 210 and a drain of the NMOS 212. An output of the buffer 210 is connected to a data input of the I2C transceiver 118, and a gate of the NMOS 212 is connected to a data output of the transceiver 118. This data input and data output of the I2C transceiver 118 correspond to the SDA terminal of the I2C transceiver 118 described with respect to FIG. 1. The source of the NMOS 212 is connected to the ground 208 via the ground pin 214.

The SDA bus 108, as a serial interface, is connected to provide two different logic states. In this regard, the SDA bus 108 is connected to the voltage source 204 via the resistor 206, so that the SDA bus 108 is pulled high (to the source voltage) by default, with the high representing a first of the two different logic states (for example, logic zero). The I2C transceiver 118 can connect the SDA bus 108 to ground 208 by providing a gate voltage to the NMOS 212 to turn on the NMOS 212. Accordingly, turning on the NMOS 212 pulls the SDA bus 108 to a low (ground) voltage, with the low representing a second of the two different logic states (for example, logic one). The I2C transceiver 118 can monitor an SDA signal, and thus the logic value represented, on the SDA bus 108 via the SDA pin 132 and the buffer 210 by turning off the NMOS 212. This is referred to as the first controller 202a releasing the SDA bus 108.

Each of the controllers 202 can send an SDA signal representing a read or write command to the SDA bus 108. SDA signals are further described with respect to FIGS. 3A, 3B, and 4. The read or write command is to be executed by a target 104, corresponding to a target address included in the SDA signal stream. If multiple controllers 202 send an SDA signal at the same time, the one that has its read or write command executed first is determined using an arbitration process described below. In some examples, controllers 202 can also be used as targets 104.

In some examples, the CPU 114 knows the target addresses of targets 104 connected to the SCL and SDA buses 106 and 108. In some examples, a processor external to the I2C system 200 that uses the controller MCU 102 to communicate with the targets 104 (for example, by sending instructions to the controller MCU 102 to be translated into messages to be sent by the I2C transceiver 118 to a corresponding target 104) knows the target addresses of targets 104 connected to the SCL and SDA buses 106 and 108. Target addresses are determined by configuration at a system level.

Returning to FIG. 1, the CPU 114 controls the I2C transceiver 118 to control specified targets 104 to execute read commands and write commands. Accordingly, each target 104 may monitor the SDA bus 108 to detect commands issued by an I2C transceiver 118, and to responsively execute such a command if addressed to the specific target 104. For read commands and for write commands, the CPU 114 provides an instruction that includes an indication of whether a read or write is to be performed, a target address indicating a corresponding one of the targets 104, a target memory address within the indicated target 104, and data to be written to the target memory address within the indicated target 104. The target addresses provided by the CPU 114 are written to the first memory 124 and to the second memory 128. Accordingly, the same target address, from the instruction provided by the CPU 114, is written to both the first memory 124 and the second memory 128.

Because the CPU 114 is connected to both the I2C transceiver 118 and to the bus monitor 120 via the CPU bus, the target address as provided by the CPU 114 can be written to the first memory 124 and the second memory 128 in parallel and without intermediation by software. Accordingly, the first memory 124 and the second memory 128 can both be written as hardware processes without additional software overhead. This enables faster I2C message processing and simpler control software development. After the I2C transceiver 118 receives the instruction from the CPU 114, it generates and sends the message (the SDA signal) to the SDA bus 108. The target address as provided by the message sent by the I2C transceiver 118 to the SDA bus 108 is then written to the second memory 128. Accordingly, both the target address as provided by the CPU 114 and the target address as provided by the I2C transceiver 118 are written to the second memory 128.

The clock 112 provides the clock signal at the base frequency to the I2C transceiver 118. The I2C transceiver 118 generates an SCL signal responsive to the clock signal with a frequency corresponding to I2C data rates. In some examples, I2C messages (SDA signals) have data rates between 100 kilohertz (kHz) and 400 kHz. The I2C transceiver 118 generates an SDA signal with data toggles timed responsive to clock edges of the SCL signal. Data toggles are high to low or low to high voltage transitions of the SDA signal. Data toggle timing, and sampling of the SDA signal using the SCL signal, are further described with respect to FIG. 4.

The I2C transceiver 118 provides the SCL signal to the SCL bus 106 via the SCL pin 130, and provides the SDA signal to the SDA bus 108 via the SDA pin 132, as further described below. The I2C transceiver 118 also provides the SCL signal, the SDA signal, and an Ignore Condition signal to the bus monitor 120. In response to an Ignore Condition signal, the bus monitor 120 stops comparing the two target addresses stored in the second memory 128. This corresponds to the bus monitor 120 not proceeding to determine whether it should generate an Error Interrupt signal. Recall that the target address in the instruction provided by the CPU 114 is stored in the second memory 128. And also, the target address in the SDA signal provided by the I2C transceiver 118 to the SDA bus 108 is stored in the second memory 128.

In some examples, additional actions taken by the bus monitor 120 or the I2C transceiver 118 following an Ignore Condition signal are dependent on the type of Ignore Condition signal. An Arbitration Lost signal or an Illegal Stop signal can be asserted by the I2C transceiver 118 as an Ignore Condition signal. The Arbitration Lost signal and the Illegal Stop signal are each described (further) below. In some examples, ignore conditions occur during normal operation of an I2C system 200.

The bus monitor 120 samples the SDA signal received via the feedback connection from the I2C transceiver 118. The bus monitor 120 samples the SDA signal using the SCL signal (also received via the feedback connection) to determine the target address indicated by the SDA signal. The target address indicated by the SDA signal is stored in the second memory 128. The comparator 126 compares the target address provided by the CPU 114 to the target address indicated by the SDA signal. If the target addresses are the same, the bus monitor 120 provides a deasserted Error Interrupt signal to the event handler 116. The deasserted Error Interrupt signal indicates that the target address included in the SDA signal matches the target address provided by the CPU 114.

If the target addresses are different, the bus monitor 120 provides an asserted Error Interrupt signal to the event handler 116. The asserted Error Interrupt signal indicates a target addressing fault. In some examples, the bus monitor 120 provides the Error Interrupt signal to the event handler 116 immediately after detecting the target addressing fault, without waiting to determine whether an Ignore Condition signal will be received.

In some examples, a target addressing fault can be caused by a fault within the controller MCU 102 (with a controller 202), or by a fault on the SDA bus 108. In some examples, a target addressing fault is caused by a random hardware fault, accordingly a reliability issue, in the I2C transceiver 118 or the SDA bus 108 (or 204). A random hardware fault in the I2C transceiver 118 can occur in the processor 122 or the first memory 124. The event handler 116 may be implemented using hardware, software (such as software instructions stored in a memory and executed by the CPU 114), or a combination of both.

Figure 4:
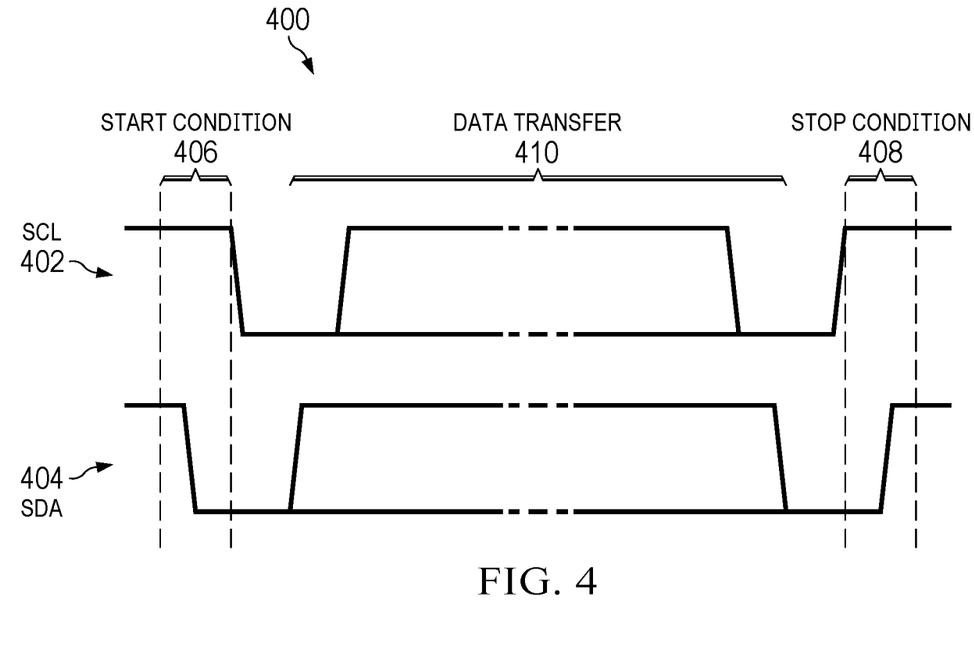
FIG. 4 is a timing diagram showing timing of a serial clock signal and a serial data signal to provide a START condition signal and a STOP condition signal.

In some examples, in response to an asserted Error Interrupt signal (target addressing failure), the CPU 114 initiates a STOP condition on the SDA bus 108 using the I2C transceiver 118. In some examples, initiating a STOP condition corresponds to transmitting a STOP condition signal 408 (FIG. 4). In some examples, in response to an asserted Error Interrupt signal, the event handler 116 can trigger a power on reset (POR) of the controller MCU 102. In some examples, in response to an asserted Error Interrupt signal, the event handler 116 can send a message to an IC controlling the I2C system 100 indicating improper function of the controller MCU 102 and cause the controller MCU 102 to enter a safe state in which the controller MCU 102 does not send signals to the SCL and SDA buses 106 and 108.

As described above, the I2C transceiver 118 also provides the SCL signal to the SCL bus 106 via the SCL pin 130, and provides the SDA signal to the SDA bus 108 via the SDA pin 132. All of the targets 104 connected to the SCL and SDA buses 106 and 108 receive the SCL and SDA signals. The target 104 corresponding to the target address included in the SDA signal executes the read and/or write instruction included in the SDA signal.

In response to an SDA signal corresponding to a write command, a target 104 indicated by the SDA signal writes data included in an SDA signal to a memory address included in the SDA signal. In response to an SDA signal corresponding to a read command, a target 104 indicated by the SDA signal writes a memory address indicated by the SDA signal to a memory of the target 104, reads data from the memory indicated by the address, and provides the read data to the I2C transceiver 118. In some examples, the transceiver 118 provides read data and acknowledgment signals received from the target 104 to the CPU 114. I2C read and write signal structure and process are further described with respect to FIGS. 3A and 3B.

Ignore Condition signals are now described. A STOP condition signal 408, further described in FIG. 4, concludes an I2C communication (a message) between a controller 202 and a target 104. An illegal stop is a STOP condition signal 408 that appears in a position within an I2C communication that does not correspond to a normal I2C read or write message. The STOP condition signal 408 and Illegal Stop signal are further described with respect to FIG. 4.

Two controllers 202 simultaneously attempting to send an SDA signal are referred to as being in arbitration. An asserted Arbitration Lost signal can be produced if two controllers 202 (see FIG. 2) attempt to send an SDA signal at the same time. As described above, the I2C transceiver 118 sends a logic one as a ground voltage, and accordingly, connects the SDA bus 108 to ground 208 to send the logic one. The I2C transceiver 118 sends a logic zero as a source voltage, and accordingly, releases the SDA bus 108 from the connection to ground 208 to allow the SDA bus 108 to be pulled up to by the voltage source 204 to send the logic zero.

The controller 202 that first attempts to send a logic zero (releases the SDA bus 108 to go high) while the other controller 202 attempts to send a logic one (connects the SDA bus 108 to ground 208 to pull the SDA bus 108 low) will be unsuccessful in sending the logic zero because of the ground 208 connection. The unsuccessful controller 202 is referred to as having lost the arbitration. The unsuccessful controller 202 knows it is unsuccessful because it receives the SDA signal on the SDA bus 108 via the buffer 210. A lost arbitration corresponds to the SDA bus 108 carrying an SDA signal with a lower voltage than the logic zero (high), specifically, a voltage corresponding to the ground connection made by the arbitration-winning controller 202.

The I2C transceiver 118 that unsuccessfully attempted to send the logic one provides the asserted Arbitration Lost signal to its corresponding bus monitor 120, and stops sending its SDA signal. The controller 202 that won the arbitration is allowed to send its SDA signal without interference, and the controller 202 that lost the arbitration waits until the SDA signal of the arbitration winner concludes. In some examples, the SDA signal concluding corresponds to a STOP condition signal 408 as described with respect to FIG. 4.

After the STOP condition signal 408, the controller 202 that lost the arbitration attempts again to send its SDA signal. If the bus monitor 120 receives the asserted Arbitration Lost signal, the bus monitor 120 stops operating with respect to the discontinued SDA signal. When the discontinued SDA signal is resent, the resent message is treated by the bus monitor 120 as if the initial transmission attempt had not occurred.

Figure 3A:
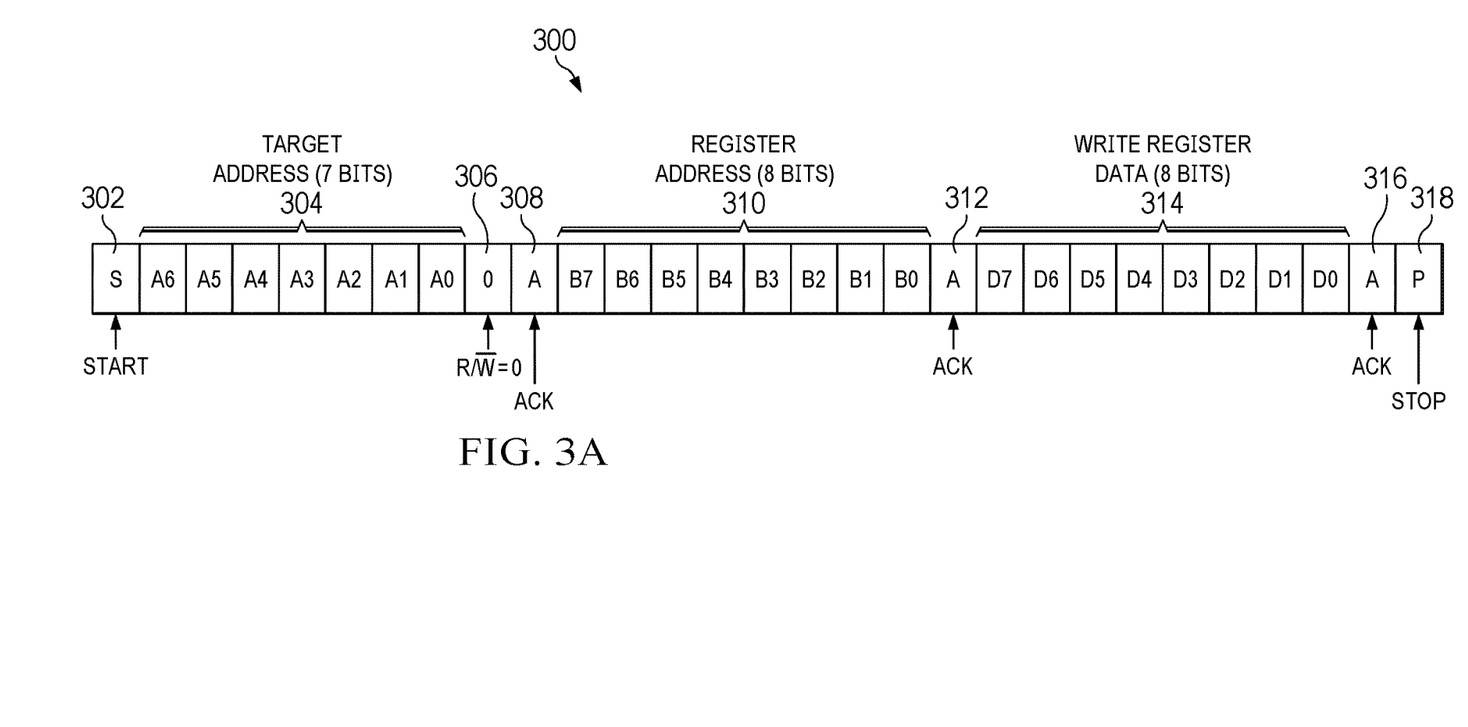
FIG. 3A is a bitwise structure of an example I2C communication between the controller microcontroller unit and a target of FIG. 1 to effect a write command.

FIG. 3A is a bitwise structure of an example I2C communication 300 between the controller MCU 102 and a target 104 of FIG. 1 to effect a write command.

The I2C transceiver 118 of the controller MCU 102 sends a START condition (S) signal 302 on the SDA bus 108, a target address 304 specifying a number $p^{th}$ target (e.g., target 104a, in an example) 104a to perform the write command, and a read/write bit (an R/W bit) 306 set to zero. The START condition signal 302 is further described with respect to FIG.

4. The seven target address 304 bits are numbered A6, corresponding to a most significant bit (MSB), through A0, corresponding to a least significant bit (LSB). The seven-bit target address enables addressing of $2^7=128$ targets 104. The bar over the W and not the R in R/$\overline{\text{W}}$ indicates that the write meaning is asserted when the R/$\overline{\text{W}}$ bit 306 equals zero, and the read meaning is asserted when the R/$\overline{\text{W}}$ bit 306 equals one.

After receiving the START condition signal 302, the target address 304, and the R/$\overline{\text{W}}$ bit 306, the target 104a corresponding to the target address 304 sends a first acknowledgement (ACK, or A) bit 308 confirming receipt to the SDA bus 108. The controller MCU 102 then sends a register address 310 to the SDA bus 108 indicating the memory address in the target 104a of a register to be written to. In some examples, the register address 310 is a one byte (eight bit) address, numbered B7 at an MSB through B0 at an LSB. The target 104a writes the register address 310 to a memory of the target 104a, and references the written register address 310 to perform the requested memory write.

After the target 104a sends a second ACK bit 312 confirming register address 310 receipt and ready status to the SDA bus 108, the controller MCU 102 sends a register data 314 to the target 104a to be written to the register address 310. In some examples, the register data 314 is a one byte (eight bit) data, numbered D7 at an MSB through D0 at an LSB. After the target 104a receives and writes the register data 314, the target 104a sends a third ACK bit 316 to the controller MCU 102.

Following the third ACK bit 316, the controller MCU 102 can either send additional bytes of register data 314, or (as illustrated) it can send the target 104a a STOP condition signal 318 to end the I2C communication 300. The STOP condition signal 318 also indicates to other controllers 202 that the SCL bus 106 and SDA bus 108 are available for messaging.

Figure 3B:
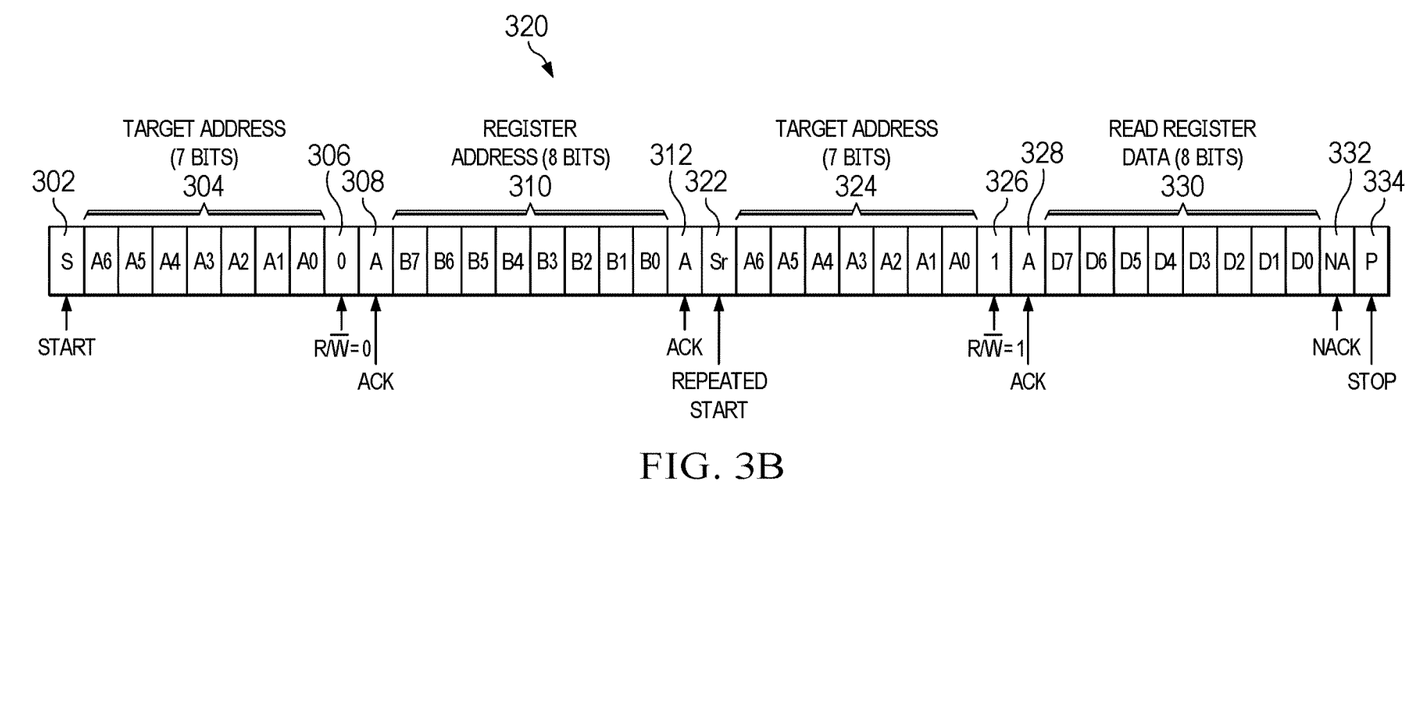
FIG. 3B is a bitwise structure of an example I2C communication between the controller microcontroller unit and a target of FIG. 1 to effect a read command.

FIG. 3B is a bitwise structure of an example I2C communication 320 between the controller MCU 102 and a target 104 of FIG. 1 to effect a read command. An initial portion of the I2C communication 320 corresponds to an initial portion of the I2C communication through the second ACK bit 312. The I2C communication 320 to effect a read command begins by providing a target address 304 of a specified target 104a, providing a R/$\overline{\text{W}}$ bit 306 equal to zero so that a register address 310 will be written, and providing a register address 310 at which the read will begin. Accordingly, the target memory address where the read will start is written first, and the data is read from the memory at that address (and in some examples, from memory at sequentially subsequent addresses).

After receiving the second ACK bit 312 from the target 104a, indicating that the register address 310 has been written, the controller MCU 102 sends a repeated START condition (Sr) signal 322, which enables sending an R/$\overline{\text{W}}$ bit 306 corresponding to a read action. In some examples, the repeated START condition signal 322 has similar or identical SCL and SDA signal timing (see FIG. 4) to a START condition signal 302 initiating an I2C communication 300 or 320 (see FIG. 4). After sending the repeated START condition signal 322, the controller MCU 102 sends the target address 324 again, and then an R/$\overline{\text{W}}$ bit 306 equal to one, indicating the read action.

In response to the R/$\overline{\text{W}}$ bit 306 the target 104a sends a third ACK bit 328, then sends a byte of read register data 330 retrieved from a memory of the target 104 beginning at the register address 310. After the controller MCU 102 receives the read register data 330, it can send the target 104a an ACK bit, which causes the target 104a to read another byte of data from a memory address sequentially subsequent to the end of the read register data 330. Alternatively, as in the illustrated example, the MCU controller 102 can send an inverted acknowledgment bit (NACK, or NA) 332 to the target 104a. The NACK bit 332 commands the target 104a to halt communications and release the SDA bus 108. The MCU controller 102 will follow the NACK bit with a STOP condition signal 334. In some examples, an ACK bit is asserted low, and a NACK bit is asserted high.

FIG. 4 is a timing diagram 400 showing timing of an SCL signal 402 and an SDA signal 404 to provide a START condition signal 406 and a STOP condition signal 408. Data transfer 410 from a controller 202 to a target 104, and/or from the target 104 to the controller 202, is performed between the START condition signal 406 and the STOP condition signal 408.

A START condition signal 406 corresponds to a falling edge of the SDA signal 404 while the SCL signal 402 is high. A STOP condition signal 408 corresponds to a rising edge of the SDA signal 404 while the SCL signal 402 is high. An illegal STOP, triggering an Illegal Stop signal (as described above), corresponds to a STOP condition signal 408 generated at a portion of an SDA signal 404 not corresponding to one of the expected STOP condition signal 408 locations described with respect to FIGS. 3A and 3B.

When the I2C transceiver 118 detects an illegal STOP condition, it sends an Illegal Stop signal to the bus monitor 120, and a state machine of the I2C transceiver 118 resets. A state machine of the I2C transceiver 118 tracks which bit (or other signal) in an I2C communication (such as an I2C communication 300 to effect a write command or an I2C communication 320 to effect a read command) the I2C transceiver 118 is currently sending. Accordingly, the I2C transceiver 118 state machine tracks which bit (or other signal) in which field (such as register address 310 or target address 324) is currently being generated and transmitted to the SDA bus 108 by the I2C transceiver 118. In response to the Illegal Stop signal, the bus monitor 120 aborts the comparison between the target address as provided by the CPU 114 and the target address as transmitted by the I2C transceiver 118, and avoids providing a false alarm indication to the Event handler 116.

Accordingly, transmission of I2C data bits (not shown in FIG. 4) corresponds to the SDA signal 404 not changing for the duration of a high period (half clock cycle) of the SCL signal 402. In other words, to provide data, the SDA signal 404 toggles while the SCL signal 402 is low, and remains constant while the SCL signal 402 is high. This corresponds to the SDA signal 404 having a constant low (logic one) or high (logic zero) value while the SCL signal 402 provides a rising edge and then a falling edge. Accordingly, the frequency and phase of the SCL signal 402 can be described as being synchronized to the data of the SDA signal 404.

Figure 5:
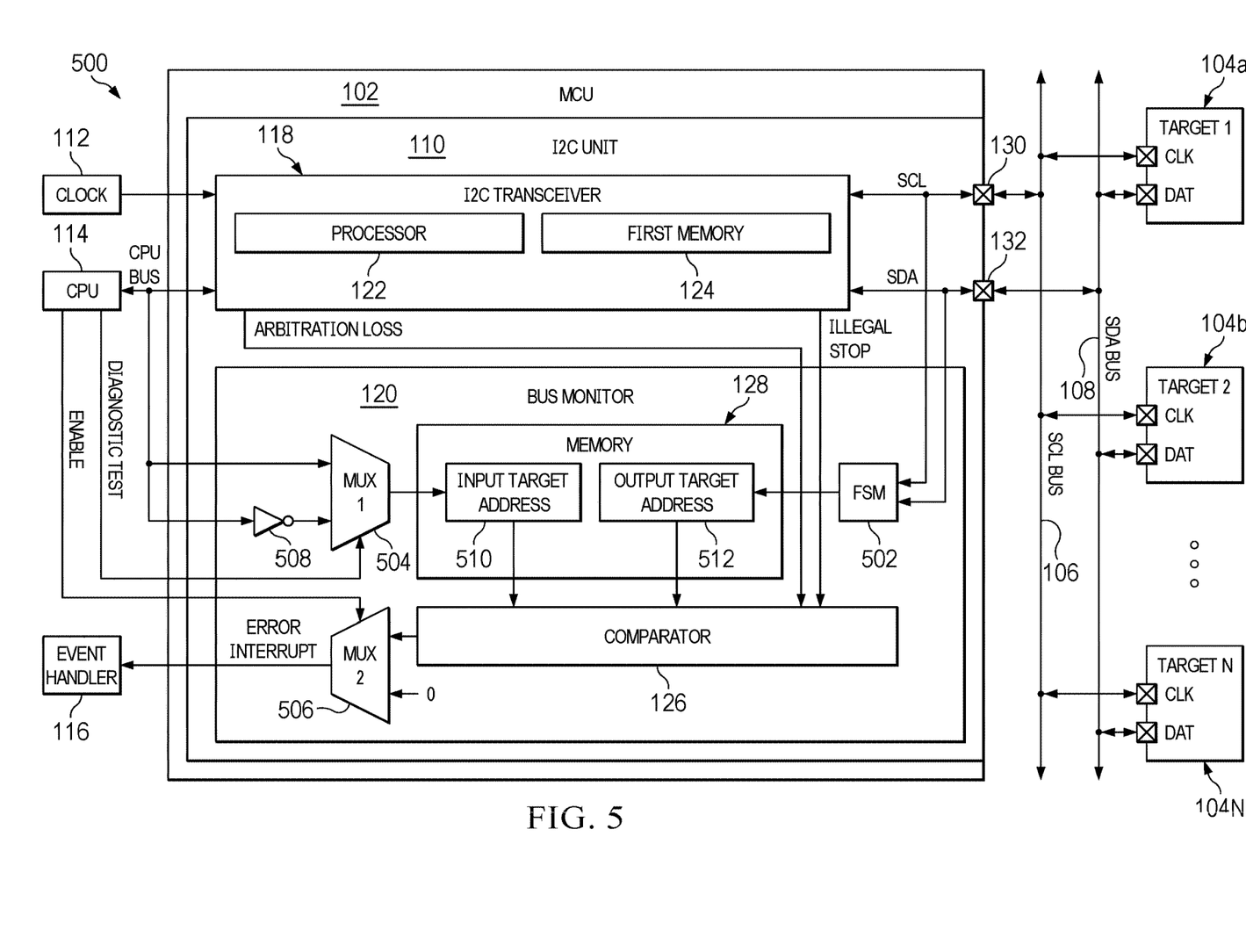
FIG. 5 is a functional block diagram of a third example I2C system.

FIG. 5 is a functional block diagram of a third example I2C system 500. In the I2C system 500, the bus monitor 120 includes a finite state machine (FSM) 502, a first multiplexer (MUX 1) 504, a second multiplexer (MUX 2) 506, and a logic inverter 508. The memory 128 includes an input target address memory 510 and an output target address memory 512. Input target address memory 510 refers to input of the I2C transceiver 118 received from the CPU 114, and output target address memory 512 refers to output of the I2C transceiver 118 as an SDA signal sent to a target 104. The input and output target address memories 510 and 512 correspond to the second memory 128 of FIG. 1.

The data terminal of the CPU 114 is connected, via the CPU bus, to the data terminal of the I2C transceiver 118, a first input of MUX 1 504, and an input of the logic inverter 508. An output of the logic inverter 508 is connected to a second input of MUX 1 504. A diagnostic test output of the CPU 114 provides a Diagnostic Test signal to a control input of MUX 1 504. An output of MUX 1 504 is connected to an input of the input target address memory 510. An enable output of the CPU 114 provides an Enable signal to a control input of MUX 2 506.

The SCL terminal of the I2C transceiver 118 is connected to the SCL pin 130 and to a clock input of the FSM 502. The SDA terminal of the I2C transceiver 118 is connected to the SDA pin 132 and to a data input of the FSM 502. An output of the FSM 502 is connected to an input of the output target address memory 512. An output of the input target address memory 510 is connected to a first data input of the comparator 126, and an output of the output target address memory 512 is connected to a second data input of the comparator 126.

A first ignore output of the I2C transceiver 118 is connected to a first ignore input of the comparator 126 and provides an Arbitration Loss signal. A second ignore output of the I2C transceiver 118 is connected to a second ignore input of the comparator 126 and provides an Illegal Stop signal.

An output of the comparator 126 is connected to a first input of MUX 2 506. A second input of MUX 2 506 receives a signal with a logic zero value, corresponding to the deasserted Error Interrupt signal. An output of MUX 2 506 provides the Error Interrupt signal to the event handler 116.

The FSM 502 extracts the target address from the SDA signal (the message sent by the transceiver 118) in response to the SCL signal. Extraction of data from an SDA signal (parsing the SDA signal in response to the SCL signal) is described above with respect to FIG. 4. In some examples, the FSM 502 is programmed, and/or includes hardware, to extract a configured number of bits following a START condition signal 406 in the SDA signal. Accordingly, in examples corresponding to in I2C communications 300 or 320 as described above with respect to FIGS. 3A and 3B, corresponding to (respectively) write or read commands, the target address is a set of bits sequentially following a START condition signal 406. The configured number of bits is the number of bits in target addresses corresponding to targets 104 connected to the SCL and SDA buses 106 and 108. In some examples, the configured number of bits is seven or ten (or a different number).

In some examples, the FSM 502 detects an ignored condition such as an Arbitration Lost condition or an Invalid Stop condition. In some examples, the FSM 502 does so in response to an Ignored Condition signal provided by the I2C transceiver 118. In some examples, the FSM 502 independently detects an ignored condition by parsing the SDA signal in response to the SCL signal as described with respect to FIG. 4.

The comparator 126 compares the target address stored in the input target address memory 512 to the target address stored in the output target address memory 512, and provides an output in response to the comparison. In some examples, the comparator 126 provides a logic one output if the two target addresses are different, corresponding to an addressing failure, and provides a logic zero output if the two target addresses are the same, corresponding to normal addressing operation. If the Enable signal is asserted, MUX 2 506 provides the output of the comparator 126 to the event handler 116. If the Enable signal is deasserted, MUX 2 506 provides a logic zero, indicating normal operation or a do-not-care state, to the event handler 116.

If the Diagnostic Test signal is deasserted, MUX 1 504 provides a signal received at its noninverted input to the input target address memory 510. If the Diagnostic Test signal is asserted, MUX 1 504 provides a signal received at its inverted input to the input target address memory 510. Accordingly, the CPU 114 can assert the Diagnostic Test signal to test valid function of the comparator 126 by deliberately injecting a fault using the inverted signal. If the Diagnostic Test signal is asserted, valid function of the comparator 126 will correspond to an Error Interrupt signal indicating addressing failure. If the Diagnostic Test signal is deasserted, valid function of the comparator 126 is assumed (or previously verified by diagnostic) and the output of the comparator 126 will depend on valid function of the I2C transceiver 118.

Figure 6:
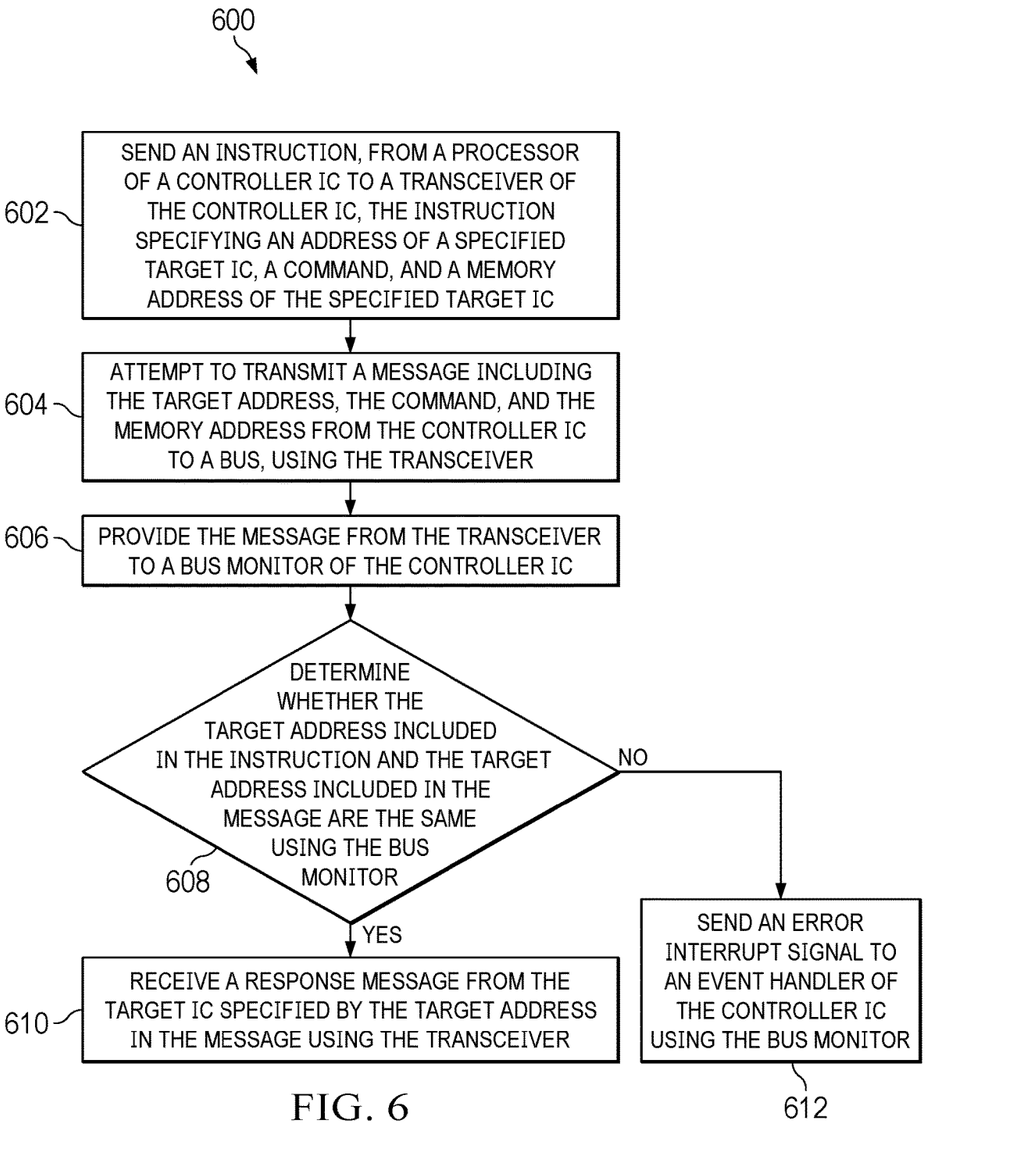
FIG. 6 is a process 600 for operating the controller MCU of FIG. 1.

FIG. 6 is a process 600 for operating the controller MCU 102 of FIG. 1. In step 602, send an instruction, from a processor of a controller IC to a transceiver of the controller IC. The instruction specifies an address of a specified target IC, a read or write command, and a memory address of the specified target IC. In some examples, the controller IC is the controller MCU 102, the processor is the CPU 114, the instruction is the data provided by the CPU 114 to the I2C transceiver 118, and the command is a read command or a write command.

In step 604, attempt to transmit a message including the target address, the command, and the memory address from the controller IC to a bus, using the transceiver. In some examples, the bus is the SDA bus 108. In step 606, provide the message from the transceiver to a bus monitor of the controller IC. In some examples, steps 604 and 606 correspond to the signal paths for an SDA signal transmitted by the I2C transceiver 118, specifically, to the SDA bus 108 via the SDA pin 132, and to the bus monitor 120.

In step 608, determine whether the target address included in the instruction and the target address included in the message are the same using the bus monitor. If the target addresses are the same, then in step 610, receive a response message from the target IC specified by the target address in the message using the transceiver. If the target addresses are not the same, then in step 612, send an error interrupt signal to an event handler.

In some examples, systems and methods described herein, including the bus monitor 120, enable compliance of an I2C controller 202 with requirements, such as safety requirements, of a safety or other standard such as International Electrotechnical Commission (IEC) 61784. For example, IEC 61784 requires addressing authentication. In some examples, satisfaction of this requirement is enabled by the bus monitor 120 detecting addressing faults and providing the Error Interrupt signal.

Modifications are possible in the described examples, and other examples are possible within the scope of the claims.

In some examples, the event handler 116 is part of the CPU 114.

In some examples, circuits described herein, such as a target 104, the processor 122, the comparator 126, the CPU 114, or the MCU 102, can be implemented using a processor such as a CPU, digital signal processor (DSP), or MCU.

In some examples, disclosed processes and structures are used to enable data integrity verification for a communication protocol other than I2C, such as serial peripheral interface (SPI) or universal asynchronous receiver/transmitter (UART).

In some examples, a target address within an I2C (or other) communication includes a different number of bits than described above, such as ten bits, corresponding to $2^{10}$=1024 addressable targets.

In some examples, the CPU 114 provides the read/write command as a read/write flag. In some examples, the CPU 114 provides the instruction in a form that indicates the target address, read/write flag, and memory address. In some examples, the I2C transceiver 118 (such as the processor 122 of the I2C transceiver 118) interprets the instruction to generate a corresponding I2C communication. Accordingly, in some examples, the formats, such as bitwise formats, of the instruction and the I2C communication are different.

In some disclosed processes and structures are used to compare signal fields other than target address to confirm that portions of a message transmitted to a target by a transceiver of a controller match corresponding portions of an instruction from a processor of the controller instructing the transceiver to generate and transmit the message.

In some examples, the bus monitor 120 compares fields in messages transmitted by the I2C transceiver 118 to the SDA bus 108 to a corresponding field in an instruction by the CPU 114 to the I2C transceiver 118 in addition to or other than the target address field.

In some examples, a processor outside the controller 202 provides the instruction that the I2C transceiver 118 uses to generate the message (I2C communication).

In some examples, processors described herein are implemented using a CPU, a digital signal processor (DSP), or an MCU.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples may be included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

What is claimed is:

1. An integrated circuit (IC) comprising:
   a first pin;
   a second pin;
   a bus monitor having a first input, a second input, a third input, and an output; and
   a transceiver having an input, a first output, and a second output, the input of the transceiver and the first input of the bus monitor each configured to receive an instruction that indicates an instructed target address, a read/write flag, and a memory address, the first output of the transceiver coupled to the first pin and to the second input of the bus monitor, the second output of the transceiver coupled to the second pin and to the third input of the bus monitor, and the transceiver configured to generate a message in response to the instruction so that the message includes a message target address, the read/write flag, and the memory address;

wherein the bus monitor is configured to compare a signal received at its first input to a signal received at its second input, the comparison responsive to a signal received at its third input, and to provide a signal in response to the comparison.

2. The IC of claim 1, wherein the IC is an inter-integrated circuit controller.

3. The IC of claim 1,
wherein the bus monitor includes a first memory and a second memory; and
wherein the bus monitor is configured to write the instructed target address to the first memory, and is configured to write the message target address to the second memory.

4. The IC of claim 1, wherein the bus monitor is configured to compare the instructed target address to the message target address.

5. The IC of claim 1,
further including a clock circuit having a clock configured to provide a first clock signal with a first clock frequency;
wherein the transceiver has a clock input coupled to the clock output of the clock circuit, and is configured to generate a second clock signal responsive to the first clock signal, the second clock signal having a second clock frequency; and
wherein the transceiver is configured to generate the message in response to the second clock signal, and to provide the second clock signal at the second output of the transceiver.

6. The IC of claim 1,
wherein the bus monitor includes a finite state machine configured to determine the message target address in response to the signal received at the first input of the bus monitor and the signal received at the third input of the bus monitor;
wherein the bus monitor is configured to determine the instructed target address in response to the signal received at the second input of the bus monitor; and
wherein the compare action compares the message target address to the instructed target address.

7. The IC of claim 1, wherein the transceiver includes a control output, the IC further comprising:
a ground pin; and
a transistor including a first terminal, a second terminal, and a control terminal, the first terminal of the transistor coupled to the first pin, the second terminal of the transistor coupled to the ground pin, and the control terminal of the transistor coupled to the control output of the transceiver.

8. The IC of claim 1,
wherein the bus monitor includes a multiplexer and a logical inverter, the multiplexer having first and second inputs, a control input, and an output, and the logical inverter including an input and an output; and
wherein the first input of the multiplexer is configured to receive the instruction, the input of the logical inverter is configured to receive the instruction, the second input of the multiplexer is coupled to the output of the logical inverter, the control input of the multiplexer is configured to receive a diagnostic test control signal, and the output of the multiplexer is coupled to the second input of the bus monitor.

9. The IC of claim 1, wherein the bus monitor includes a multiplexer, the multiplexer having first and second inputs, a control input, and an output, and the first input of the multiplexer is coupled to the output of the bus monitor.

10. An integrated circuit (IC) comprising:
a first pin;
a second pin;
a processor having an input and an output, the processor configured to provide, via the output, an instruction that indicates an instructed target address, a read/write flag, and a memory address;
a bus monitor having a first input, a second input, a third input, and an output, the output of the bus monitor coupled to the input of the processor; and
a transceiver having an input, a first output, and a second output, the output of the processor coupled to the input of the transceiver and to the first input of the bus monitor, the first output of the transceiver coupled to the first pin and to the second input of the bus monitor, the second output of the transceiver coupled to the second pin and to the third input of the bus monitor, and the transceiver configured to generate a message in response to the instruction so that the message includes a message target address, the read/write flag, and the memory address;
wherein the bus monitor is configured to compare a signal received at its first input to a signal received at its second input, the comparison responsive to a signal received at its third input, and to provide a signal to the processor in response to the comparison.

11. The IC of claim 10, wherein the IC is an inter-integrated circuit controller.

12. The IC of claim 10,
wherein the bus monitor includes a first memory and a second memory; and
wherein the bus monitor is configured to write the instructed target address to the first memory, and is configured to write the message target address to the second memory.

13. The IC of claim 10, wherein the bus monitor is configured to compare the instructed target address to the message target address.

14. The IC of claim 10 further comprising a clock circuit,
wherein the clock circuit includes an output that is configured to provide a clock signal with a clock frequency;
wherein the transceiver has a clock input, and the output of clock circuit is coupled to the clock input of the transceiver; and
wherein the transceiver is configured to generate the message in response to the clock signal.

15. The IC of claim 10,
wherein the bus monitor includes a finite state machine configured to determine the message target address in response to the signal received at the first input of the bus monitor and the signal received at the third input of the bus monitor;
wherein the bus monitor is configured to determine the instructed target address in response to the signal received at the second input of the bus monitor; and wherein the compare action compares the message target address to the instructed target address.

16. The IC of claim 10, wherein the transceiver includes a control output, the IC further comprising:
- a ground pin; and
- a transistor including a first terminal, a second terminal, and a control terminal, the first terminal of the transistor coupled to the second pin, the second terminal of the transistor coupled to the ground pin, and the control terminal of the transistor coupled to the control output of the transceiver.

17. The IC of claim 10,
wherein the processor has a control output;
wherein the bus monitor includes a multiplexer and a logical inverter, the multiplexer having first and second inputs, a control input, and an output, and the logical inverter including an input and an output; and
wherein the first input of the multiplexer and the input of the logical inverter are each coupled to the output of the processor, the second input of the multiplexer is coupled to the output of the logical inverter, the control input of the multiplexer is coupled to the control output of the processor, and the output of the multiplexer is coupled to the second input of the bus monitor.

18. The IC of claim 10,
wherein the processor includes a control output; and
wherein the bus monitor includes a multiplexer, the multiplexer having first and second inputs, a control input, and an output, the first input of the multiplexer coupled to the output of the bus monitor, the control output of the multiplexer coupled to the control output of the processor, and the output of the multiplexer coupled to the input of the processor.

19. A method of operating an integrated circuit (IC), the method comprising:
- sending an instruction by a processor to a transceiver, the instruction specifying an instructed address of a specified target IC, a read or write command, and a memory address of the specified target IC;
- transmitting out of the IC, by the transceiver, a message including a message address corresponding to the instructed address, the command, and the memory address;
- determining, using a bus monitor, whether the instructed address and the message address are the same; and
- determining whether to provide, by the bus monitor to an event handler, an error interrupt signal based on whether the instructed address and the message address are the same.

20. The method of claim 19, further comprising:
- generating a clock signal having a clock frequency, wherein the transmitting includes transmitting out of the IC, by the transceiver, the clock signal; and
- prior to the determining, parsing the message, using a finite state machine of the bus monitor, in response to the clock signal, to recover the message address from the message.

* * * * *